US006731793B1

(12) United States Patent
Usbeck et al.

(10) Patent No.: US 6,731,793 B1
(45) Date of Patent: May 4, 2004

(54) METHOD FOR DETERMINING THE EDGE POSITION IN COLOR IMAGES, PARTICULARLY FOR COLOR AND INTENSITY TRANSITIONS

(75) Inventors: Christian Usbeck, Benshausen (DE); Peter Brueckner, Suhl (DE)

(73) Assignee: ZSP Geodaetische Systeme GmbH, Jena (DE)

( * ) Notice: Subject to any disclaimer, the term of this patent is extended or adjusted under 35 U.S.C. 154(b) by 535 days.

(21) Appl. No.: 09/641,749

(22) Filed: Aug. 18, 2000

(30) Foreign Application Priority Data

Aug. 18, 1999 (DE) .......................... 199 38 588
Apr. 18, 2000 (DE) .......................... 100 20 067

(51) Int. Cl.$^7$ ................................. G06K 9/00
(52) U.S. Cl. ...................... 382/164; 382/165
(58) Field of Search ................ 382/162–167, 382/173–180; 358/504–540; 345/589–605

(56) References Cited

U.S. PATENT DOCUMENTS

| | | | | |
|---|---|---|---|---|
| 5,295,236 A | * | 3/1994 | Bjorge et al. | 715/527 |
| 5,418,574 A | * | 5/1995 | Miyabata et al. | 348/625 |
| 5,682,249 A | * | 10/1997 | Harrington et al. | 382/162 |
| 5,825,938 A | * | 10/1998 | De Lange | 382/162 |
| 6,262,747 B1 | * | 7/2001 | Rocheleau et al. | 345/434 |
| 6,304,670 B1 | * | 10/2001 | Berestov | 382/166 |
| 6,345,117 B2 | * | 2/2002 | Klassen | 382/167 |
| 6,556,313 B1 | * | 4/2003 | Chang et al. | 358/1.9 |

OTHER PUBLICATIONS

Tranhanias et al. "Vector order statistics operator as color edge detector" IEEE Trans. on System, Man, and Cybernetics, vol. 26 No. 1, p. 135–143 Feb. 1996.*

* cited by examiner

*Primary Examiner*—Jingge Wu
(74) *Attorney, Agent, or Firm*—Reed Smith LLP

(57) ABSTRACT

A method for determining the edge position in color images, particularly for color transitions and intensity transitions is disclosed. In accordance with the method, the edge locations found in the total image or in individual color extracts coincide as closely as possible. Further, every color value F is changed to a vector representation $\overline{OF^i}$ proceeding from a selected point O of the color space F to determine the edge location K, and in that the transition from a color $F_L$ at the left of edge K to a color $F_R$ at the right of edge K is determined in order to determine the edge position along a given sampling direction by means of a method based on the vector representation $\overline{OF^i}$. The method according to the invention is directed for determining the edge position in color images, particularly with detection of color transitions and intensity transitions in color space F.

7 Claims, 3 Drawing Sheets

| Color extract | Abbreviation | X-position | Y-position |
|---|---|---|---|
| Red | R | 0.00 | 0.00 |
| Green | G | 153.00 | 150.89 |
| Blue | B | 154.00 | 150.89 |
| Vectorial | RGB | 154.00 | 150.90 | ns
METHOD FOR DETERMINING THE EDGE POSITION IN COLOR IMAGES, PARTICULARLY FOR COLOR AND INTENSITY TRANSITIONS

BACKGROUND OF THE INVENTION a) Field of the Invention

The invention is directed to a method for determining the edge position in color images, particularly with detection of color transitions and intensity transitions in color space F.

b) Description of the Related Art

The prior art discloses methods for determining the location of edges based on analysis of a one-dimensional gray value curve (g) along a sampling straight line (x). Typical gray value curves g(x) are dark-light transitions, light-dark transitions, light bars and dark bars. The edge finding is based on analyzing these gray value curves and obtaining position information which describes the position of the actual edge exactly with respect to pixels or subpixels. Transfer to two-dimensional and three-dimensional image structures is carried out with any quantity of sampling straight lines in the plane g(x, y) or in the space g(x, y, z).

This edge finding accordingly presupposes that only one function value, the gray value g, can change within the image or, in other words, edge finding is only applicable to gray images. Color images do not meet this precondition because with color images three function values, e.g., the primary color values red R (x, y), green G (x, y) and blue B (x, y), can change depending on location.

In order to find edge locations in color images in spite of this, previous methods made use of transformation of the color image to a gray image. For this purpose, the gray value was typically determined corresponding to the basic equation of color television technology Y=0.3 R+0.5 G+0.1 B. Further, it is also possible to apply the known algorithms to the individual color extracts R, G, B.

With these methods, edge locations can be determined in the gray image Y (x, y) generated from a color image R (x, y), green G (x, y) and blue B (x, y) by means of the above-mentioned transformation as well as in every individual color extract. However, this method is deficient in that the edge locations found in the gray image or in individual color extracts generally do not coincide. Therefore, the actual edge cannot be exactly determined.

OBJECT AND SUMMARY OF THE INVENTION

It is the primary object of the invention to provide a method of the type mentioned above in which the edge locations found in the total image or in individual color extracts coincide as closely as possible.

In accordance with the invention, this object is met by a method for determining the edge positions in color images, particularly with detection of color transitions and intensity transitions in a color space F. The steps of the method comprise changing every color value $F^i=(X_1^i, X_2^i, X_3^i)^T \ni F$ to a vector representation $\overline{OF^i}$ proceeding from a selected point $O=(O_1, O_2, O_3)^T$ of the color space F to determine the edge location K; and determining the transition from a color $F_L$ at the left of edge K to a color $F_R$ at the right of edge K in order to determine the edge position along a given sampling direction by a method based on the vector representation $\overline{OF^i}$.

The method is based on the application and examination of the processes in real image data in which the spacing of two colors is greatest at the edge.

The cross-product $|\overline{OF^i} \times \overline{OF^{i+1}}|$, which corresponds to the plotted parallelogram surface of vectors $\overline{OF^i} \times \overline{OF^{i+1}}$, is a measure for the vectorial distance between two colors.

By means of the operation according to the invention, the edge function is directly generated in the color image. Along a given sampling straight line, the scalar product of the two associated spatial vectors is determined in the RGB color space between every point $P_n$ ($R_n$, $G_n$, $B_n$) and its successor $P_{n+1}$ ($R_{n+1}$, $G_{n+1}$, $Bn_{+1}$). Accordingly, a one-dimensional function curve occurs along the sampling straight line. All known methods for determining edge location in an exact manner with respect to pixels or subpixels from a given gray value curve can be applied to this one-dimensional function curve. According to the invention, only one individual edge location is also detected along a search ray in the color image. This conforms to the actual body edge.

Instead of the scalar product, the vectorial product can also be utilized for edge finding. For this purpose, according to the invention, the vectorial product of the two associated location vectors in the color space is determined along a predetermined sampling straight line in every point $P_n$ ($R_n$, $G_n$, $B_n$) and its successor $P_{n+1}$ ($R_{n+1}$, $G_{n+1}$, $Bn_+$). In addition to the information about the actual edge location, the vectorial calculation also provides information through the given direction of the resulting vector in space about whether the given sampling direction is an ascending edge or a descending edge.

The invention is described more fully in the following example.

DESCRIPTION OF THE PREFERRED EMBODIMENTS

As is well known, rise methods, threshold methods or correlation methods are used for determining the edge location. The previously known methods operate on an intensity image. A transformation of the color image is required in order to be able to apply the known methods in the same form in color images.

The color information is lost through the transformation from color image to gray image. An ambiguous mapping occurs in which different color values are mapped on the same intensity value. As regards the previously known sampling methods, there is no possibility in this case to determine the edge location.

A generated color transition is tested in the following.

Figure 1:
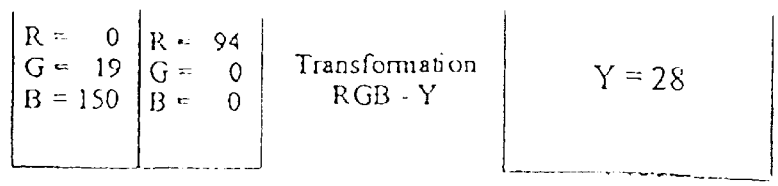
FIG. 1 shows loss of an edge transition through transformation.

As will be seen in FIG. 1, an edge location cannot be determined after the transformation of the color arrangement to the intensity image with any known intensity method. With the method according to the invention, it is possible to determine the edge location by means of the vector difference method described above.

Figure 2:
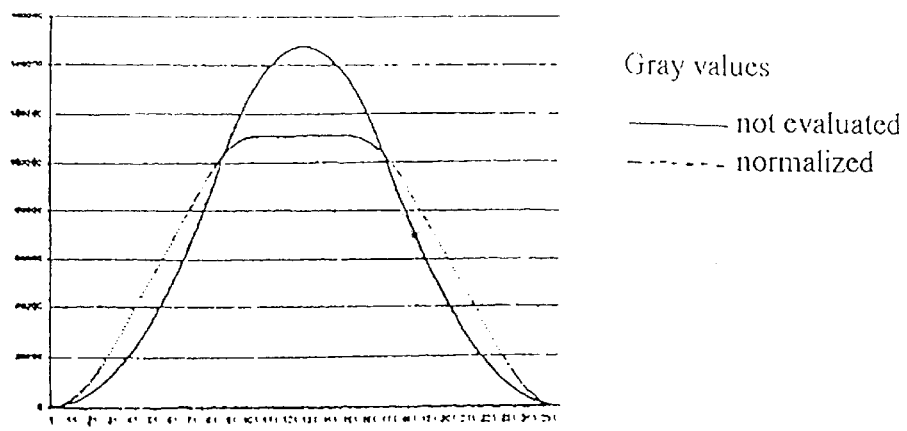
FIG. 2 illustrates mapping of the RGB color space on intensities.

For purposes of illustration, FIG. 2 shows a mapping of the RGB color space on intensity values. The colors are translated into the following intensity distribution for the RGB color space by means of the known transformation. While the shape of the distribution curve can be changed by weighting factors, a very large number of color values having the same intensity value remain.

Figure 3:
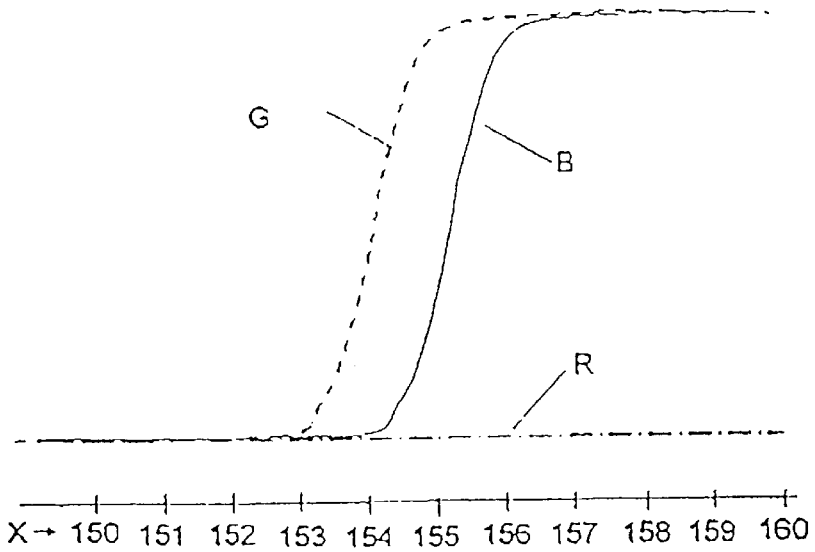
FIG. 3 shows edge transition of the individual color extracts RGB.

As will be seen from FIG. 3, the sampling of the color image by components in the individual color extracts R G B also leads to problems. The edge location determination gives divergent values for the individual color extracts.

Figures 4, 5:
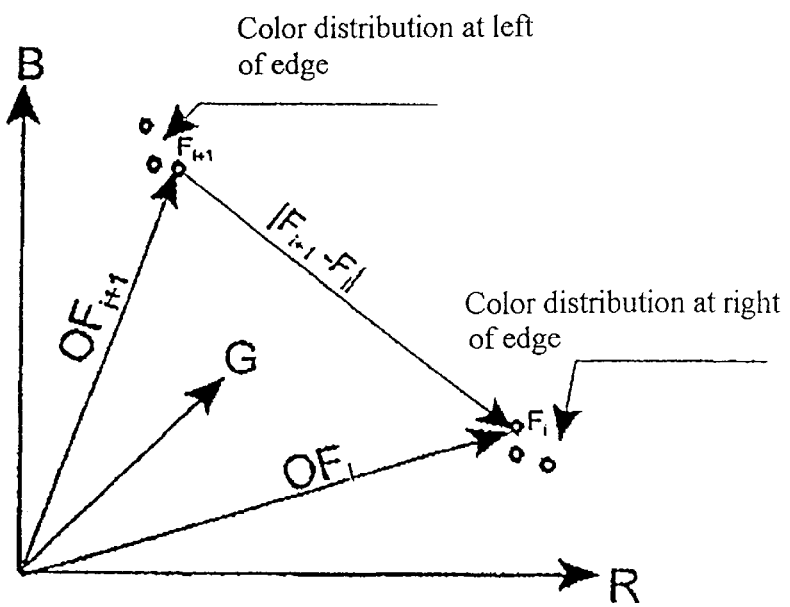
FIG. 4 shows edge location of the individual color extracts and vectorial edge location.
FIG. 5 indicates the amount of vector difference.
Figure 6:
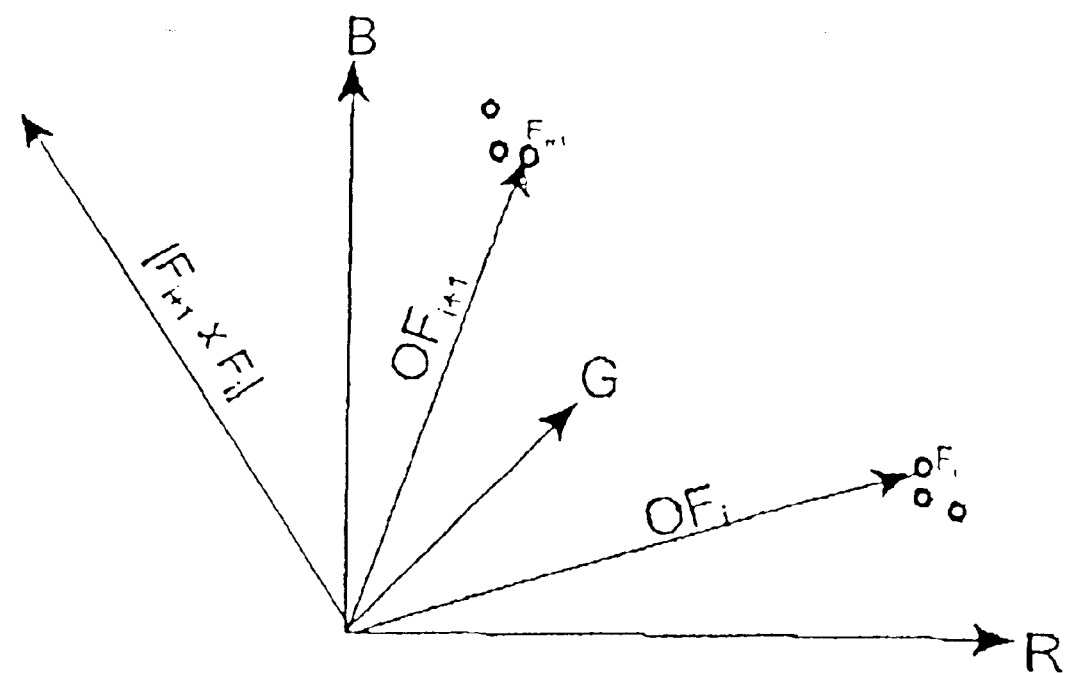
FIG. 6 shows the amount of cross-product.

FIG. 4 illustrates the same example numerically. In color extract R no transition is determined; in color extract G the transition is determined at pixel position 135; and in color extract B the transition is determined at pixel 154. This spatial difference in the green and blue frames can be produced by the shape of values along the sampling straight line and by rounding errors in the algorithm due to different value pairs. In contrast, the algorithm according to the invention has the advantage that only one edge RGB is determined at the color transition in the entire color image.

The vector difference method according to the invention can be implemented in existing algorithms for sampling intensity images and makes it possible to determine the location of color transitions and intensity transitions in color images.

While the foregoing description and drawings represent the preferred embodiments of the present invention, it will be obvious to one skilled in the art that various changes and modifications may be made therein without departing from the true spirit and scope of the present invention.

What is claimed is:

1. A method for determining the edge position in color images, particularly with detection of color transitions and intensity transitions in a color space F, comprising the steps of:

changing every color value $F^i=(X_1^i, X_2^i, X_3^i)^T \ni F$ to a vector representation $\overline{OF^i}$ proceeding from a selected point $O=(O_1, O_2, O_3)^T$ of the color space F to determine the edge location K; and determining the transition from a color $F_L$ at the left of edge K to a color $F_R$ at the right of edge K in order to determine the edge position along a given sampling one-dimensional direction and only the one-dimensional direction by a method based on the vector representation $\overline{OF^i}$.

2. The method according to claim 1, wherein the maximum amount of the vector difference $|\overline{OF^i} - \overline{OF^{i-1}}|$ is determined in the color space F for edge finding by determining the greatest distance between two colors $F_i$ and $F_j$ along a search ray in the color space F.

3. The method according to claim 1, wherein the maximum amount of the cross-product $|\overline{OF^i} \times \overline{OF^{i+1}}|$ is determined in the color space F for edge finding by determining the greatest distance between two colors $F_i$ and $F_j$ along a search ray in the color space F.

4. The method according to claim 1, wherein the RGB color space is used as color space F.

5. A method for determining the edge position in color images, particularly with detection of color transitions and intensity transitions in a color space F, comprising the steps of:

changing every color value $F^i=(X_1^i, X_2^i, X_3^i)^T \ni F$ to a vector representation $\overline{OF^i}$ proceeding from a selected point $O=(O_1, O_2, O_3)^T$ of the color space F to determine the edge location K; and determining the transition from a color $F_L$ at the left of edge K to a color $F_R$ at the right of edge K in order to determine the edge position along a given sampling direction by a method based on the vector representation $\overline{OF^i}$;

wherein the maximum amount of the cross-product $|\overline{OF^i} \times \overline{OF^{i+1}}|$ is determined in the color space F for edge finding by determining the greatest distance between two colors $F_i$ and $F_j$ along a search ray in the color space F.

6. The method according to claim 5, wherein the RGB color space is used as color space F.

7. A method for determining the edge position in color images, comprising the steps of:

changing every color value $F^i=(X_1^i, X_2^i, X_3^i)^T \ni F$, along a given sampling straight line direction and only the given straight line direction, to a vector representation $\overline{OF^i}$ proceeding from a selected point $O=(O_1, O_2, O_3)^T$ of the color space F to determine the edge location K; and determining the transition from a color $F_L$ at the left of edge K to a color $F_R$ at the right of edge K in order to determine the edge position along the given sampling straight line direction by a method based on the vector representation $\overline{OF^i}$.

* * * * *